United States Patent
Wei

(10) Patent No.: US 9,539,513 B2
(45) Date of Patent: Jan. 10, 2017

(54) METHOD AND SYSTEM FOR SIMULATIONS OF DYNAMIC MOTION AND POSITION

(76) Inventor: Jerome Hubert Wei, La Habra, CA (US)

(*) Notice: Subject to any disclaimer, the term of this patent is extended or adjusted under 35 U.S.C. 154(b) by 1822 days.

(21) Appl. No.: 12/508,462

(22) Filed: Jul. 23, 2009

(65) Prior Publication Data

US 2010/0029390 A1   Feb. 4, 2010

Related U.S. Application Data

(60) Provisional application No. 61/135,719, filed on Jul. 23, 2008.

(51) Int. Cl.
A63F 13/24 (2014.01)
A63F 13/573 (2014.01)
A63F 13/40 (2014.01)
A63F 13/812 (2014.01)

(52) U.S. Cl.
CPC ............ *A63F 13/573* (2014.09); *A63F 13/10* (2013.01); *A63F 13/812* (2014.09); *A63F 2300/6027* (2013.01); *A63F 2300/64* (2013.01); *A63F 2300/8011* (2013.01)

(58) Field of Classification Search
CPC .............. A63F 2300/00; A63F 2300/64; A63F 2300/65; A63F 2300/646; A63F 2300/6623
USPC ................................................ 463/43; 703/6
See application file for complete search history.

(56) References Cited

U.S. PATENT DOCUMENTS

| | | | |
|---|---|---|---|
| 6,992,654 B2 | 1/2006 | Boswell et al. | 345/161 |
| 7,098,921 B2 | 8/2006 | Nash et al. | 345/506 |
| 2003/0032467 A1* | 2/2003 | Mayer et al. | 463/4 |
| 2003/0216161 A1 | 11/2003 | Busse et al. | |
| 2006/0148571 A1 | 7/2006 | Hossack et al. | |
| 2006/0149516 A1* | 7/2006 | Bond | A63F 13/10 703/6 |
| 2006/0262114 A1 | 11/2006 | Leprevost | |
| 2006/0274068 A1* | 12/2006 | Barthelet | G06T 13/40 345/473 |
| 2007/0085851 A1* | 4/2007 | Muller | G06T 13/20 345/474 |

(Continued)

OTHER PUBLICATIONS

Reynolds, "Flocks, Herds, and Schools: A Distributed Behavioral Model" abstract, Nov. 2000, available from http://www.red3d.com/cwr/papers/1987/boids.html on Oct. 20, 2009.

(Continued)

*Primary Examiner* — Omkar Deodhar
*Assistant Examiner* — Eric M Thomas
(74) *Attorney, Agent, or Firm* — Koppel, Patrick, Heybl & Philpott

(57) ABSTRACT

Methods and systems for simulating dynamic motion and position. The methods and systems are particularly well-suited for use in sports simulation video games (e.g., a basketball simulation) and gaming systems. Using a simplified model of mass and structure and a physics engine, realistic movement can be mimicked by simulation/game entities. For each entity a sense of balance may be measured that affects the entities ability to achieve objectives. The entities are projected onto an n-dimensional space, the properties of which affect the probability that an entity will succeed with respect to a given objective. The methods and systems may be used to generate a visual representation of simulation, such as in a video game.

17 Claims, 15 Drawing Sheets

(56) References Cited

U.S. PATENT DOCUMENTS

2007/0207846 A1\* 9/2007 Burak et al. .................... 463/9
2007/0296723 A1 12/2007 Williams

OTHER PUBLICATIONS

NBA 2K—from Wikipedia, pp. 1-4, available from http://en.wikipedia.org/wiki/NBA 2k, on Oct. 20, 2009.
NBA Live Series, from Wikipedia, pp. 1-3, available from http://en.wikipedia.org/wiki/NBA live series, on Oct. 20, 2009.
NBA 08—from Wikipedia, pp. 1-2, available from http://en.wikipedia.org/wiki/NBA 08, on Oct. 20, 2009.
Massive Prime, Simulating Life, Software 2000, available from http://www.massivesoftware.com/prime/ on Oct. 20, 2009.

\* cited by examiner

METHOD AND SYSTEM FOR SIMULATIONS OF DYNAMIC MOTION AND POSITION

The present application claims the benefit of the filing date of the related Provisional Patent Application No. 61/135,719 filed with the United States Patent and Trademark Office on Jul. 23, 2008.

BACKGROUND OF THE INVENTION

Field of the Invention

The invention relates generally to methods and systems for simulations of dynamic motion and position and, more specifically, to methods and simulations for such simulations used in video games.

Description of the Related Art

Sports simulation games are a popular component of the video game market. Although much progress has been made, certain games still lack the game play flow of the sports which they purport to simulate. For example, video games that simulate the game of basketball have become very popular. Sports and simulation games, such as flight simulators, have become a major industry unto themselves.

Sports simulations present particular challenges in terms of game design and execution because gamers are familiar with the real-world games. In contrast with other types of games (e.g., fantasy games), where the environment and interactions between game entities are completely at the discretion of the game creators, aspects of sport simulations are dictated by the real-world sport itself. As a result, discrepancies between the virtual and real-world versions of a given sport are readily apparent to gamers. This is especially true with sports, such as basketball, that are easily accessible either on television or through physical participation.

Many would consider the fundamental gamer objective in a video game is to have fun. In sport simulation games part of the fun is realistic competition. In competition of any type, the objective is always the same: to win. Gamers will construct strategies within the simulated world in order to achieve this one objective. The greater the error between the simulation and the corresponding real world sport, the greater the discrepancies between these gamer constructed strategies and those of the sport itself. For games which are billed as sport simulations, and for the gamers who purchase and play these games, an accurate simulation of dynamic motion and position is critical.

Certain sports lend themselves to simulation more so than others. For instance American football, with its discrete downs, resets at the line of scrimmage, and highly scripted plays, allows for accurate simulation. On the other hand, in sports such as basketball and soccer, a single instance of continuous play lasts much longer on average. Accordingly, simulation errors have greater time to accumulate and to become more apparent to the game player.

While scripted plays in American football are designed to create an opening which is instantly exploited, the scripted portion of a basketball play is used to create an opening which is often just the beginning of an offensive sequence. An initial opening is usually not large enough to instantly exploit, but does cause a sequence of rotations and player movements that can be used to create ever larger openings, which may be ultimately exploited. The result of this game play pattern is that continuous play sequences are not as mechanical, relying much more on flow and individual decisions.

For example one challenge in basketball simulation is the discrete nature of actions and movements. On many systems, a particular action/movement is executed with a directional input from thumb sticks and a combination of buttons. This input set is then mapped to a corresponding animation, which in turn takes a certain amount of time to complete before a subsequent input set may be read. While the number of button combinations allows for a large number of actions/movements, systems do not take full advantage of the available analog inputs. As a consequence, an action/movement is either executed in full or not executed at all. Along with controller input, player collisions can induce player movement. Delegating player movement to the animation system takes this responsibility away from the physics engine. Collisions are a large part of the game, and removing this responsibility from the physics engine introduces simulation error with significant ramifications in game play.

In addition to the discrete paradigm, the lack of a dynamic player balance measurement affects game play. Performing a number of actions, such as running around multiple screens, making multiple direction changes, getting bumped off course, or executing repeated crossovers and pivots, does not prevent a player from taking a perfectly stable squared up jump shot at the end of such a wild movement sequence. This aspect results in a bias favoring individual one-on-one play, de-emphasizing the importance of team play.

Finally and most importantly, the inadequate use of artificial intelligence has drastic effects on game play. For example, in real-world basketball a defender is constantly assessing the current threat posed by each offensive player and the ability of his teammates to affect those offensive players. This assessment is used to determine the defender's own optimal position to minimize offensive threats. In the same manner, an offensive player makes the same assessment and attempts to maximize his/her own offensive threat. Using this assessment, players dynamically adjust to the current situation based on their own abilities, the ability of their teammates and opponents, and the relative position of each player on the court. This player behavior is poorly modeled in modern games, resulting in a game flow that does not reflect actual basketball strategies and tactics.

Game play adjustments have been made in recent years in an attempt to address some of these issues. Computer controlled defensive players are allowed to make hyper-speed movements, making it exceedingly difficult for an offensive player to get by the on-ball defender and allowing off-ball defenders to easily recover to proper defensive positions. While this adjustment does indeed counter exploits of the current simulation model, it in no way results in a more realistic game flow. In fact, an adjustment that allows physics to be violated introduces additional simulation error as in-game openings and advantages fail to correlate with those observed in real-world basketball. This problem is observed in many different sports simulation games.

SUMMARY OF THE INVENTION

A method for simulating dynamic events in a video game according to one embodiment of the present invention comprises the following actions. Game entity instructions related to at least one game entity are received, the game entity instructions comprising instructions from artificial intelligence inputs. Game constants associated with said at least one game entity are called. A game entity balance measurement is calculated using a balance simulation model, wherein the instructions and the game constants are combined to generate a balance simulation model output. Game entity events are generated based on balance simulation model output.

A system for calculating game events according to one embodiment of the present invention comprises the following elements. An input module is configured to receive game entity information. A storage module is configured to store constants related to at least one game entity. A physics module is connected to apply game physics rules to information received in the input module and the constants. A balance simulation module is connected to control stability and movement of game entities using values from the physics module. An interaction handler module which combines input module outputs and balance simulation module outputs with game entity interaction rules generates game entity events. An artificial intelligence module determines actions of system controlled entities by combining game entity event information from the modules with game entity threat information. A game entity event output module for outputs game event simulation values.

A method for simulating game entity balance according to one embodiment of the present invention comprises the following actions. Constants related to at least one game entity are called. Instructions related to at least one game entity are received. The instructions and the constants are applied to a movement model related to the at least one game entity. The instructions and the constants are applied to a stability meter related to the at least one game entity. Outputs from the movement model and the stability meter are combined to generate a game entity balance value.

DETAILED DESCRIPTION OF THE INVENTION

Embodiments of the invention described herein provide a new simulation and analysis model for dynamic games of movement and position. Although embodiments of the present invention are discussed with specific reference to a basketball game, it is understood that the methods and systems described herein may be applied to any sports game, simulation program, or computer software platform that models the motion and position of objects. Overall system architecture and specific algorithms are presented as embodiments of the present invention in the context of a basketball simulation; however, as stated above, the methods and systems are in no way limited to any particular application.

Although the ordinal terms first, second, etc. may be used herein to describe various elements, components, and/or modules, these elements, components, and/or modules should not be limited by these terms. These terms are only used to distinguish one element, component, and/or module from another. Thus, a first element, component, and/or module discussed below could be termed a second element, component, and/or module without departing from the teachings of the present invention.

Figure 1:
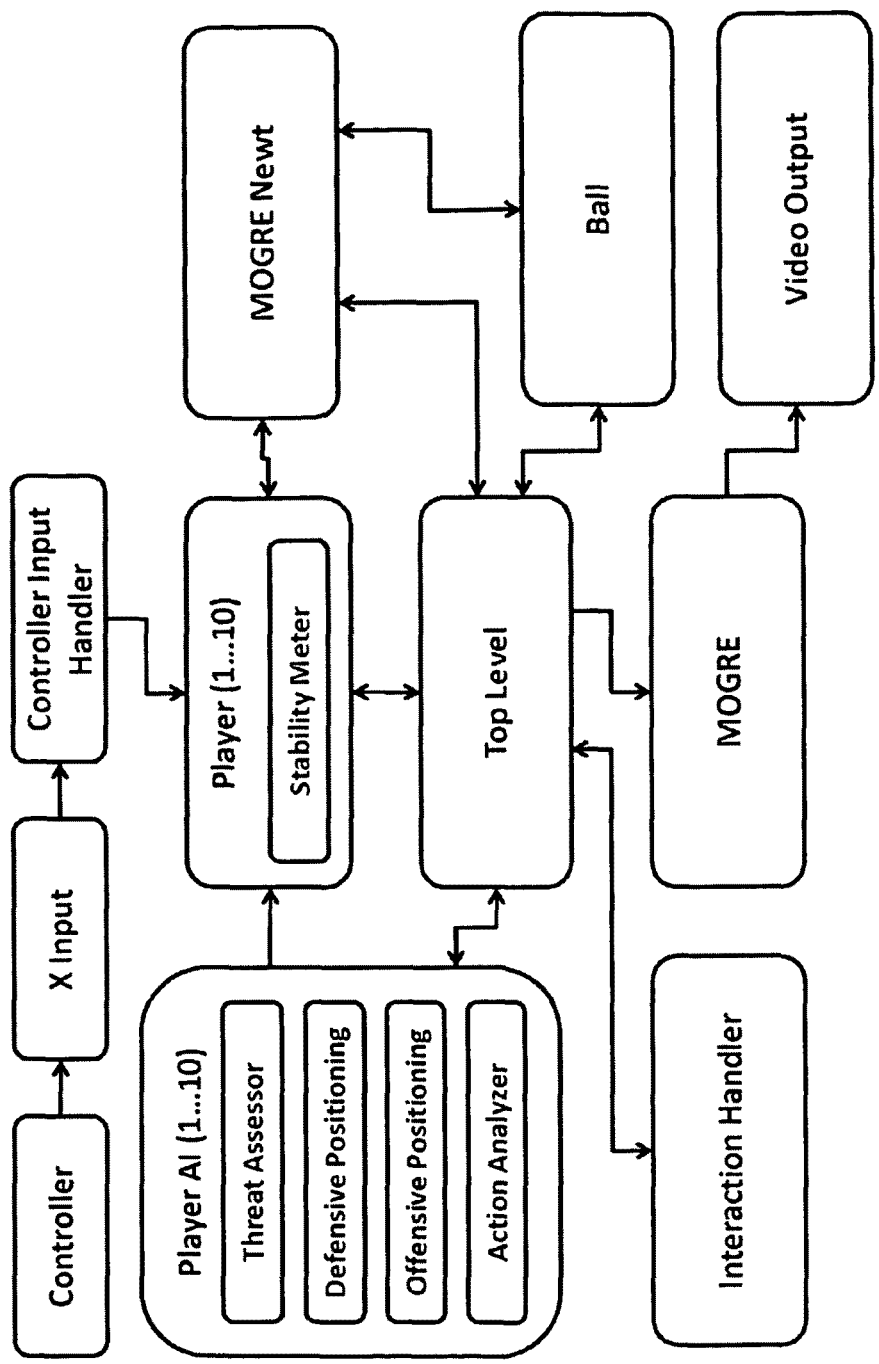
FIG. 1 is a system-level architecture diagram according to one embodiment of the present invention.

FIG. 1 shows a system-level architecture diagram according to one embodiment of the present invention. The X-Input, MOGRE Newt, and MOGRE blocks represent foundation libraries on which the simulation is built. The Controller Input Handle and the Interaction Handler are event handlers. The Player Artificial Intelligence (AI) block represents an artificial intelligence engine. The Player 1 . . . 10 and Ball blocks represent In-Game Entities. The Top Level block represents a Master Scheduler/Book Keeper. Key elements of the simulation model are discussed below. It is understood that these elements may function as software implementations within a system or as discrete system modules themselves.

A physical movement model provides a framework for player movement, timing, and animation as well as providing a measure of player balance. This is implemented at the Player block.

The interaction handler enforces game-play rules, determining the outcome of all interactions between in-game entities. Some the interactions handled in a basketball game are dribbling, deflecting, stripping, shooting, passing, catching, etc. Other interactions may also be processed in the interaction handler.

A threat assessor determines the offensive threat posed by a given offensive player due to position relative to the goal as well as capability and position relative to other players. This system provides the analysis used by the Player Artificial Intelligence system. It comprises four assessments: a physical movement threat score which represents the static physical capabilities of a given player; a skills threat score which represents the dynamic skills capabilities of a given player; a dive threat score which represents the ability of a player to get to the goal based on current configuration of participating players; and a ball distance threat score which represents a player's threat due to proximity to the ball (e.g., the closer a player is to the ball the higher that player's ball distance threat score will be).

The Player Artificial Intelligence system determines the positions and actions of computer controlled players. It comprises three elements: defensive positioning which is a sub-system that determines optimal position of a defensive player based on threat assessments and player tendencies; offensive positioning which is a sub-system that determines optimal position of an offensive player based on threat assessments and player tendencies; and an action analyzer, which is a sub-system that determines when computer players perform certain actions.

Figure 2:
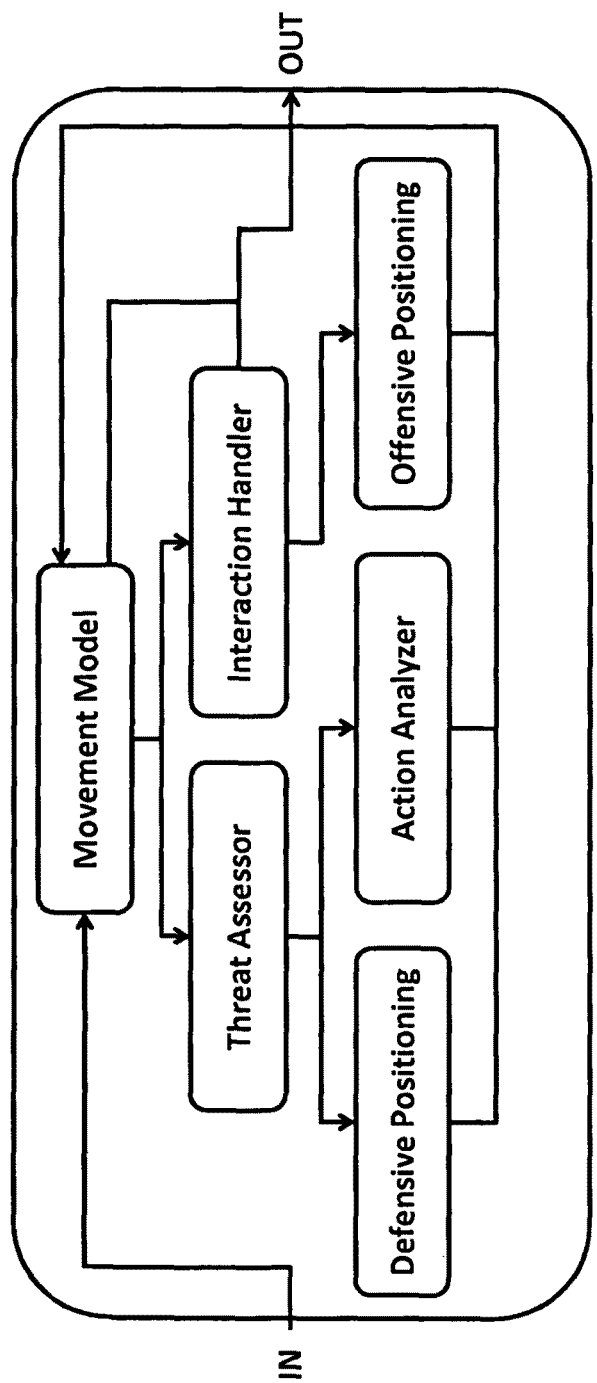
FIG. 2 is a diagram of a date/execution path of components of a system according to one embodiment of the present invention.

FIG. 2 illustrates the data/execution path for the components discussed above according to one embodiment of the present invention. Inputs are received and outputs are sent to supporting components through an interface manager. From FIG. 1 it is possible to ascertain the data dependencies of the proposed system. Errors introduced by the Movement Model will propagate to both the Interaction Handler and Threat Assessor and to other components, following the flow of the data/execution path.

Of particular note is the feedback nature of player inputs from the Player AI system, with outputs from Defensive Positioning, Offensive Positioning, and Action Analyzer which provide inputs to the Movement Model. Thus, the simulation model is able to constantly react in real-time to changing game state. This feedback system does not, however, present the usual risks of error accumulation and system instability as the current game state is continually refreshed from the rest of the system.

As stated above, the simulation may be constructed upon a foundation of existing libraries, which provide basic functionality. Some of these libraries include the open source graphics engine OGRE3D which is advantageous for its powerful functionality, ease of use, and extensive documentation. The XInput component of DirectX provides the human/computer interface through a standard XBOX360 controller, for example. Finally, the free Newton Game Dynamics Engine is used to provide accurate and stable Newtonian physics behavior. All foundation components are publicly available, free of charge. The libraries listed herein are only exemplary; the simulation is not bound to these specific libraries. The interfaces between simulation code and foundation libraries are clearly defined, allowing for ease of extraction and implementation with other libraries in a commercial product.

Movement Model

Figure 3:
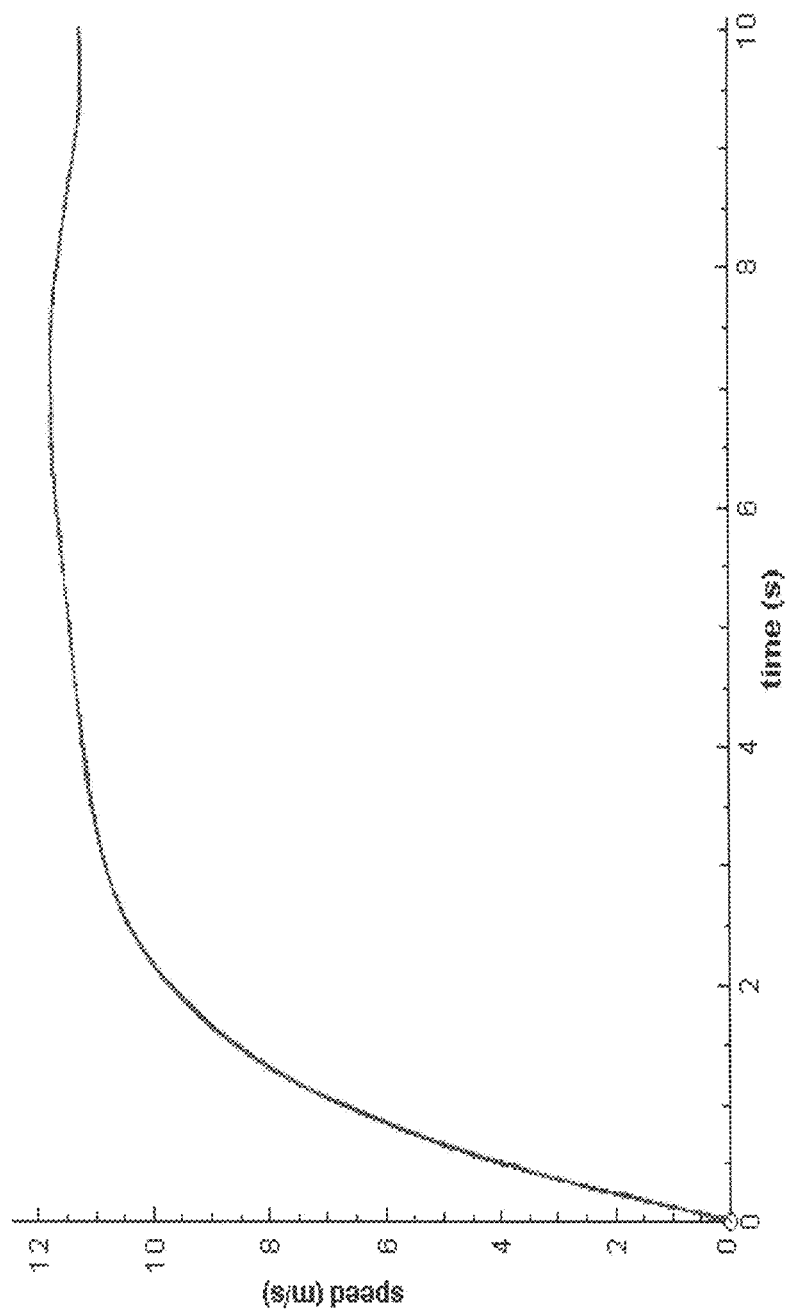
FIG. 3 is a graph of speed versus time for a sprinting human being.

Essential to the accurate construction of a sports simulation is an accurate Newtonian physics profile of human motion. FIG. 3 illustrates the acceleration curve for a human being running a 100 m sprint (albeit, a human being with world class speed). This curve is piece-wise approximated by three line segments and used as a foundation of data extrapolation.

The acceleration curve may be adjusted to typical desired player speeds. For example, in a basketball simulation game three-quarter court sprint times are available to the public on official web sites of professional basketball associations (e.g., the NBA). Thus motion, space, and time within the simulation world are firmly grounded in real world expectations. These constraints are firmly enforced, ensuring that physical realism propagates through the dependency tree shown in FIG. 2 to all simulation components. Likewise, in other kinds of simulations, other game constants can be included. For example, in a flight simulator data related to the acceleration and velocity characteristics of a given airplane may be included.

The human body is a complex system of bones, joints, muscles, and tendons that work in concert to produce a desired motion. While the motion profile data shown in FIG. 3 produce an accurate macro-model of human movement, it does not aid in modeling the relative motions of human body components. The human body is complex and for the sake of feasible implementation the minimal model displayed in FIG. 4 may be used, although other more complex models are possible.

Figure 4:
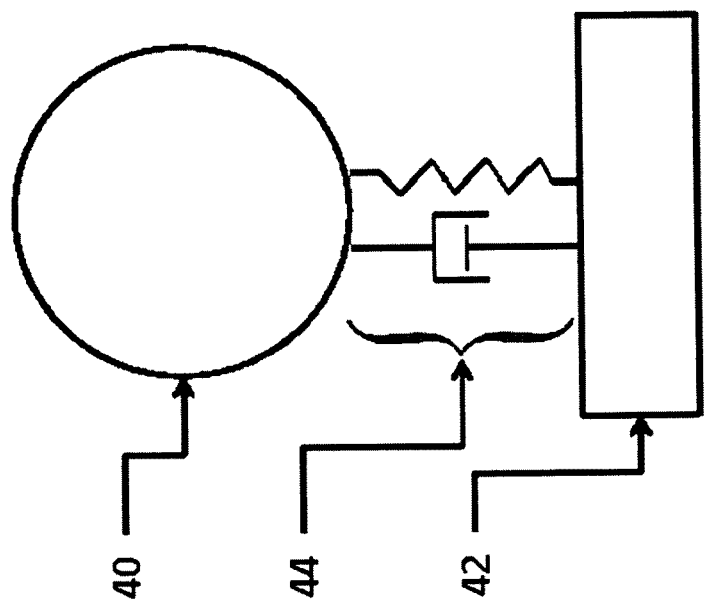
FIG. 4 is a perspective view of a damped mass-spring model.

Though simple, the model in FIG. 4 produces a significant amount of motion information pertinent to sports game play. It consists of a sphere solid 40 representing the top half of the human body and a rectangular solid 42 representing the bottom half. Total mass is distributed evenly with a spring damper 44 connecting these two solid masses. All external forces are applied to the spherical upper portion 40 only while the spring damper 44 enables movement tracking of the upper portion 40 by the lower portion 42, modeling the relative motion of the upper and lower body.

This model provides a framework that can be used to transform scripted animation sequences. More detailed human movement not directly related to game play can be motion captured and mixed with the information provided by the underlying human model. The dynamic state of the player body provided by this simple model can be used to produce more expressive non-discrete animations from a seed set of discrete motion captured animations.

Beyond animation, this model affects game play by producing realistic movement delays and reaction to external forces. Every lateral acceleration or jump requires a gathering phase which is modeled by a necessary compression of the spring damper proportional to level of acceleration. Thus, realistic movement time delays are enforced affecting overall player movement. The model provides a sense of balance that can be quantified dynamically for each game entity.

A stability meter measures the sense of balance for each in-game player. The simulation models the human upper body as a sphere of same volume and mass as the upper body portion of the player model. This solid mass is attached to the player upper body solid mass through a spring damper similar to the lower body solid mass except relative movement is constrained to the horizontal plane. As external forces are applied to the upper body solid mass, these forces are transferred indirectly to the stability meter solid mass through the spring damper.

The stability meter tracks the motion of the upper body with a certain delay and convergence time. The aggregate stability score $\epsilon[i]$ of player i is shown in Equation 1, where:

$W_{\Delta position}$, $W_{\Delta velocity}$, $W_{\Delta \theta}$, and $W_{\Delta \omega}$ are weighting factors for position, velocity, angle, and angular velocity, respectively;

$P_{upper}[i]$, $V_{upper}[i]$, $\theta_{upper}[i]$, and $\omega_{upper}[i]$ are position, velocity, angle, and angular velocity of the player upper body solid mass, respectively;

$P_{meter}[i]$, $V_{meter}[i]$, $\theta_{meter}[i]$, and $\omega_{meter}[i]$ are position, velocity, angle, and angular velocity of the stability meter solid mass, respectively; and $\Delta P_{max}$, $\Delta V_{max}$, $\Delta \theta_{max}$, and $\Delta \omega_{max}$ are the position, velocity, angle, and angular velocity offsets between upper body and stability meter solid masses, respectively.

Stability Measurement  Eq. 1

$$\epsilon[i] = 1 - W_{\Delta position} * \frac{|P_{upper}[i] - P_{meter}[i]|}{\Delta P_{max}} -$$

-continued $$W_{\Delta velocity} * \frac{|V_{upper}[i] - V_{meter}[i]|}{\Delta V_{max}} -$$

$$W_{\Delta\theta} * \frac{|\theta_{upper}[i] - \theta_{meter}[i]|}{\Delta\theta_{max}} - W_{\Delta\omega} * \frac{|\omega_{upper}[i] - \omega_{meter}[i]|}{\Delta\omega_{max}}$$

Figure 5:
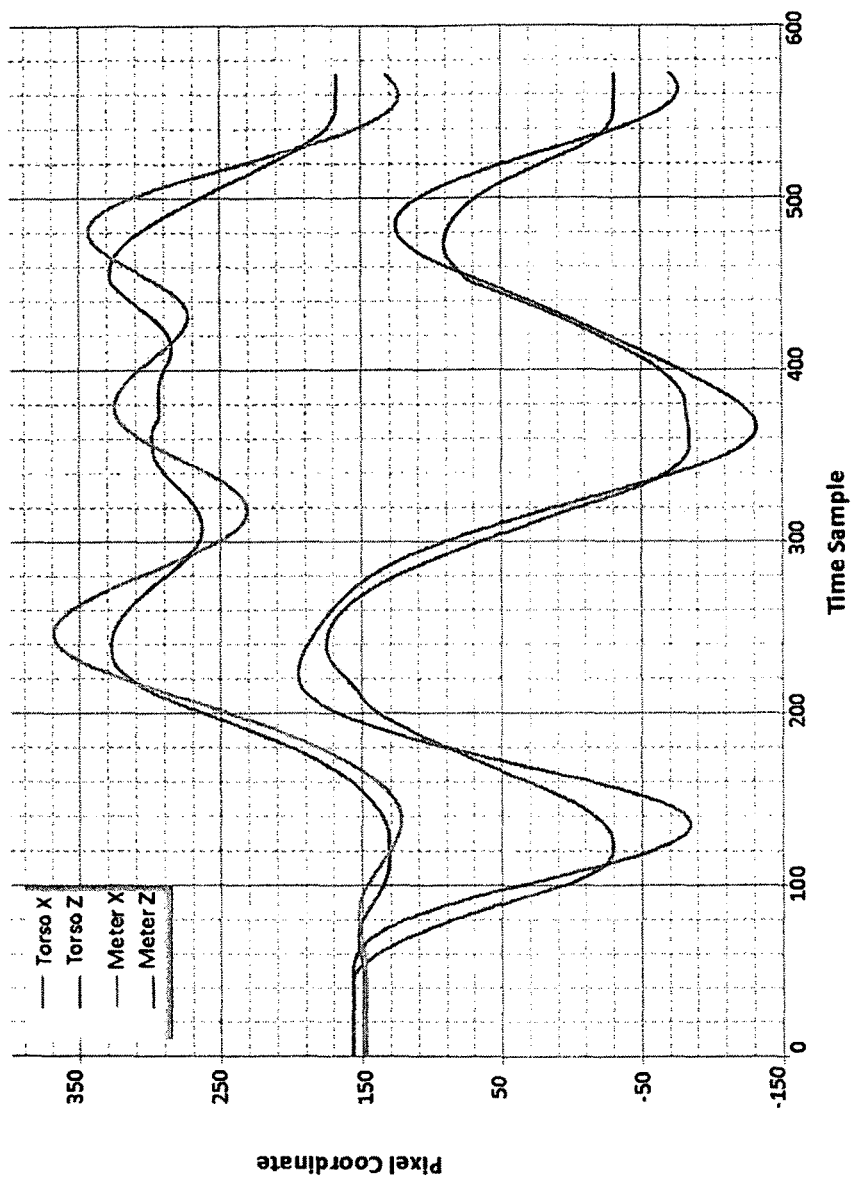
FIG. 5 is a graph of pixel coordinate versus time sample.

From Equation 1, it is observed that when the upper body and stability meter are perfectly matched, the player stability equals one, and as deviation arises along the measurement parameters the stability measurement is degraded. FIG. 5 shows this tracking behavior through experimentally gathered data.

This measurement of stability is performed for each simulation time step, uninterrupted by player state transitions, and is utilized in both threat assessment and interaction calculations as described below.

Interaction Handler

In-game interactions between player entities are handled by the Interaction Handler. This system enforces game rules and determines the outcome of interactions based on the static and dynamic parameters of the participant players. In one embodiment (i.e. a basketball simulation) the interactions handled by this unit are: dribbling, deflecting, stripping, shooting passing, and catching.

Figure 6:
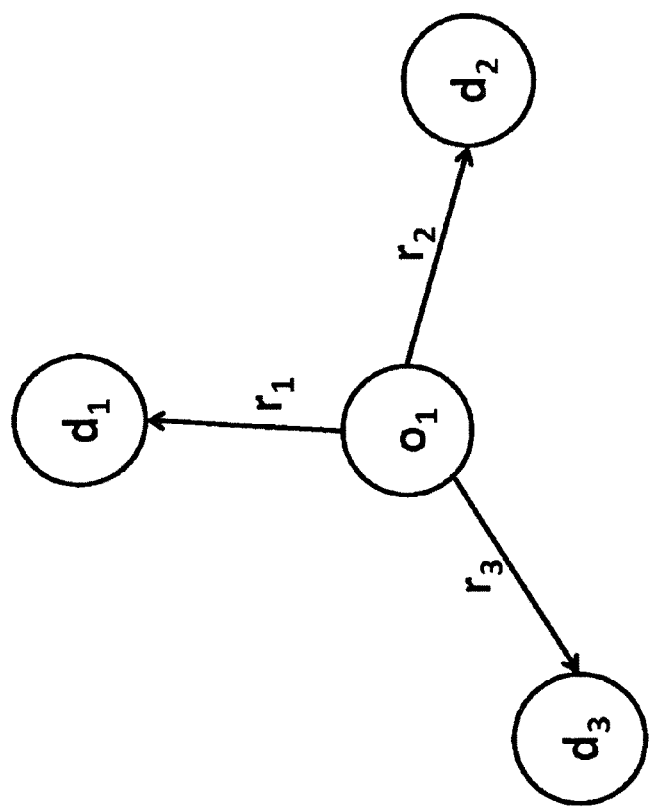
FIG. 6 is a diagram of an exemplary court configuration according to an embodiment of the present invention.

The amount of defensive pressure experienced by an offensive player while performing an action is determined by the relative positions and capabilities of the participant players. In FIG. 6, an example court configuration is shown, where: node o1 represents the offensive player; nodes d1, d2, and d3 represent the defensive players; and vectors r1, r2, and r3 represent displacement vectors from the offensive player to respective defensive players.

Capability is defined as a player's ability with respect to a particular aspect of the game and may be measured as a success probability for a given action. Each of the interactions listed above involves an interplay between offensive and defensive player capabilities. The overall score for a particular capability $C_{overall}[i]$ of offensive player i is computed as shown in Equation 2, where:

$C_{offensive}[i]$ is the computed offensive capability of offensive player i;

N is the number of defensive players involved in the interaction;

$C_{defensive}[k]$ is the computed defensive capability of defensive player k;

$r_{ik}$ is the vector magnitude from a reference point of the offensive player i to a reference point of defensive player k (for different interactions, different offensive and defensive reference points may be used);

$\alpha_C$ is a tunable effect scaling factor for defensive pressure of capability C;

$\beta_C$ is a tunable range scaling factor for defensive pressure of capability C; and $C_{offset}$ is a tunable probability offset for particular capability interaction C.

Offensive/Defense Interaction     Eq. 2

$$C_{overall}[i] = C_{offensive}[i] - \alpha_C * \sum_{k=0}^{N-1} \frac{C_{defensive}[k]}{1 + (\beta_C * r_{ik})^2} + C_{offset}$$

The calculations for the specific offensive and defensive capabilities $C_{offensive}[i]$ and $C_{defensive}[i]$ of player i are discussed in detail below. Equation 2 indicates that the effect exerted by a particular defensive player falls off by a square exponential as the distance from offensive player increases. This behavior mirrors the Coulomb's Law relationship discussed below with regard to determining optimal defensive position.

For all interactions described in this section, the following terms are defined:

$x_{rand}$ refers to a uniformly distributed random number satisfying inequality $0 \leq x_{rand} \leq 1$ (the parameter $x_{rand}$ is used to introduce a random component into interaction calculations);

$\epsilon[i]$ refers to player i's stability measurement;

$B_{static}[i]$ refers to i's static body control parameter, which determines the magnitude of player i's capability degradation due to instability;

$\xi_{scale}[k]$ is the fraction of defensive player k's scale parameter $\xi_{static}[k]$ to maximum value $\xi_{max}$;

$\phi_{static}[i]$ refers to offensive player i's traffic parameter, which determines the magnitude of player i's capability degradation due to traffic.

Defensive Mitt Scale Percentage     Eq. 3

$$\xi_{scale}[k] = \frac{\xi_{static}[k]}{\xi_{max}}$$

In some embodiments of the present invention, a static parameter is defined as a player specific parameter which is invariant of time and state. These pre-defined static parameters or game constants together constitute a player profile describing all characteristics and capabilities and are used as inputs to the dynamic system.

Figure 7:
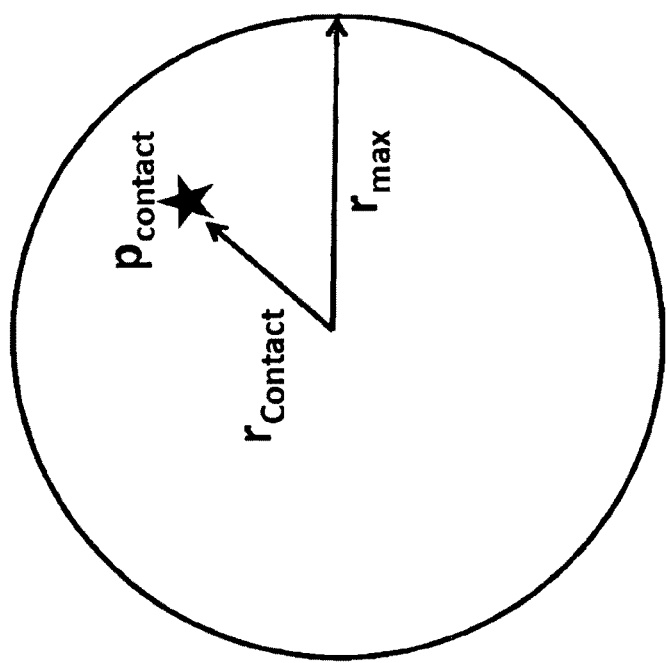
FIG. 7 is a diagram modeling a defense mitt according to an embodiment of the present invention.

Defensive interactions are initiated by contact between a defensive player's defensive mitt and the ball. The defensive mitt represents a defensive player's hands and is modeled by a circular surface representing a probability density field. Upon contact, the probability percentage value $\xi_{percent}$ is computed as shown in Equation 4, where parameters $r_{contact}$ and $r_{max}$ are illustrated in FIG. 7.

Defensive Mitt Contact Percentage     Eq. 4

$$\xi_{percent} = 1 - \frac{r_{contact}}{r_{max}}$$

In a basketball simulation the Interaction Handler also handles defensive interactions including deflect and strip interactions.

The deflect interaction is handled for any time step in which the ball is being passed and contacts a defensive player's defensive mitt. Defensive player k's deflect capability D[k] is expressed in Equation 5, where $\xi_{percent}$ is defined in Equation 4.

Deflect Capability $$D[k] = \xi_{percent} - (1 - \epsilon[k]) * (1 - B_{static}[k])$$     Eq. 5

$D_{offset}$ refers to a tunable probability offset for the deflect interaction and $C_{clean}$ refers to a tunable clean catch probability threshold. If the inequality expressed in Equation 6 is satisfied, defensive player k will be able to perform a clean catch of the ball and obtain possession.

Deflect Inequality (Clean Catch)

$$D[k] - x_{rand} + D_{offset} > C_{clean}$$     Eq. 6

Otherwise, if the inequality expressed in Equation 7 is satisfied, defensive player k will deflect the ball from its flight path but not obtain possession.

Deflect Inequality (Deflect)

$$D[k] - x_{rand} + D_{offset} > 0 \qquad \text{Eq. 7}$$

The strip interaction is handled for any time step in which a strip is being attempted and the ball contacts a defensive player's defensive mitt. Defensive player k's strip capability S[k] is expressed in Equation 8, where $\xi_{percent}$ is defined in Equation 4.

Strip Capability $$S[k] = S_{static}[k] * \xi_{percent} - (1 - \epsilon[k]) * (1 - B_{static}[k]) \qquad \text{Eq. 8}$$

Depending on whether the ball is being dribbled or held, different conditions must be met for a successful strip attempt. $D_{overall}[i]$ refers to the ball possessor player i's current dribbling score as discussed above. If the inequality expressed in Equation 9 is satisfied and the ball is currently in a dribble state, defensive player k will be able to perform a successful ball strip. Otherwise, if the inequality expressed in Equation 10 is satisfied and the ball is currently in a held state, defensive player k will be able to perform a successful ball strip. The terms static $\sigma_{static}[k]$, $D_{bonus}$, and $S_{offset}$ refer to defensive player k's strength, the tunable possessor strength bonus to be applied for held state strip attempts, and the tunable strip attempt probability offset parameter, respectively.

Strip Outcome Inequality (Dribble)

$$S[k] - D_{overall}[i] - x_{rand} + S_{offset} > 0 \qquad \text{Eq. 9}$$

Strip Outcome Inequality (Hold)

$$S[k] - (\sigma_{static}[k] * D_{bonus} + D_{overall}[i]) - x_{rand} + S_{offset} > 0 \qquad \text{Eq. 10}$$

In a basketball simulation, the Interaction Handler also handles offensive interactions such as the dribble, shoot, pass, and catch interactions.

The dribble interaction is handled for any time step in which the basketball is in a dribbled state. Offensive player i's dribble capability D[i] is expressed in Equation 11, where $D_{static}[i]$ refers to player i's static dribbling capability parameter.

Dribble Capability $$D[i] = D_{static}[i] - (1 - \epsilon[i]) * (1 - B_{static}[i]) \qquad \text{Eq. 11}$$

Defensive player k's dribble pressure capability P[k] is expressed in Equation 12, where $D_{static}[i]$ refers to player k's static dribble pressure capability parameter.

Dribble Pressure Capability $$P[k] = P_{static}[k] - (1 - \epsilon[k]) * (1 - B_{static}[k]) \qquad \text{Eq. 12}$$

Substituting terms D[i] for $C_{offensive}[i]$ and P[k] for $C_{defensive}[k]$ in Equation 2, and substituting associated dribble interaction parameters for tunable parameters $\alpha_C$, $\beta_C$, and $C_{offset}$ produces the overall dribble interaction value $D_{overall}[i]$. For the dribble interaction, the reference points producing term $r_{ik}$ are the positions of player i and k. If the resultant inequality expressed in Equation 13 is not satisfied, player i will lose control of the ball as a result of an errant dribble.

Dribble Outcome Inequality $$D_{overall}[i] - x_{rand} > 0 \qquad \text{Eq. 13}$$

The shoot interaction is handled for any time step in which a shot is released. Offensive player i's shoot capability S[i] is expressed in Equation 14, where $S_{lookup}(i, R[i])$ refers to player i's static shooting ability from a particular point on the court.

Shoot Capability $$S[i] = S_{lookup}(i, R[i]) - (1 - \epsilon[i]) * (1 - B_{static}[i]) \qquad \text{Eq. 14}$$

Figure 8:
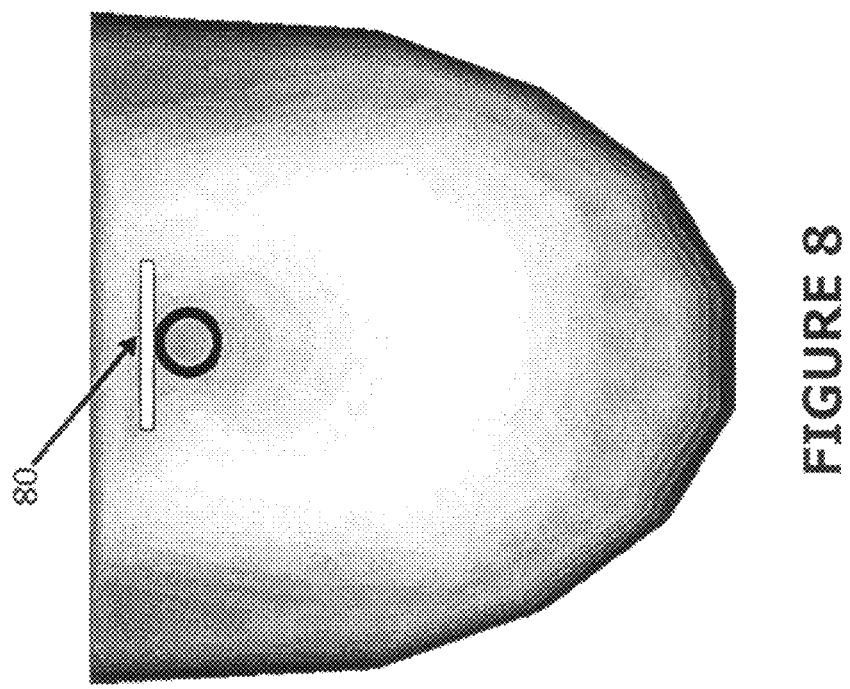
FIG. 8 is a graphic representation of a basketball court with a data set overlay modeling a shoot lookup surface according to one embodiment of the present invention.

In FIG. 8, an example shoot lookup surface is shown. A shoot lookup surface is defined as a shot make percentage for a given distance from goal 80 and angle deviation from face-on to the goal 80. Shot make percentages are defined for a discrete number of distance and angle combinations and intermediate points are linearly interpolated to produce a continuous shot probability surface. This continuous surface is also used in the offensive positioning algorithms discussed below. In FIG. 8, darker shades represent areas of high shot make percentages and lighter shades represent low shot make percentages.

Defensive player k's shoot pressure capability D[k] is expressed in Equation 15, where $E_{elevation}[k]$ is an expression of relative elevation advantage, as shown in Equation 16 and to be described below in more detail.

Shoot Pressure Capability $$D[k] = E_{elevation}[k] * (1 - \phi_{static}[k]) * (\Xi_{scale}[k] - (1 - \epsilon[k]) * (1 - B_{static}[k])) \qquad \text{Eq. 15}$$

The parameters in Equation 16 for $E_{elevation}[k]$ are defined as:
$H_{defMitt}[k]$ is the current height of defensive player k's defensive mitt;
$H_{ball}$ is the current height of the ball at release point; and
$\Delta H_{max}$ is the maximum elevation deviation range allowed.

Elevation Effect $$E_{elevation}[k] = \frac{H_{defMitt}[k] - H_{ball} + \Delta H_{max}}{2 * \Delta H_{max}} \qquad \text{Eq. 16}$$

Substituting terms S[i] for $C_{offensive}[i]$ and D[k] for $C_{defensive}[k]$ in Equation 2 and substituting associated shoot interaction parameters for tunable parameters $\alpha_C$, $\beta_C$, and $C_{offset}$ produces the overall shoot interaction value $S_{overall}[i]$. For the shoot interaction, the reference points producing term $r_{ik}$ are the positions of the ball and defensive player k's defensive mitt. If the resultant inequality expressed in Equation 17 is not satisfied, player i's shot attempt will be unsuccessful.

Shoot Outcome Inequality $$S_{overall}[i] - x_{rand} > 0 \qquad \text{Eq. 17}$$

The pass interaction is handled for any time step in which a pass is released. Offensive player i's pass capability P[i] is expressed in Equation 18, where $P_{static}[i]$ refers to player i's static passing capability parameter.

Pass Capability $$P[i] = P_{static}[i] - (1 - \epsilon[i]) * (1 - B_{static}[i]) \qquad \text{Eq. 18}$$

Defensive player k's pass pressure capability D[k] is expressed in Equation 19.

Pass Pressure Capability $$D[k] = (1 - \phi_{static}[i]) * (\Xi_{scale} - (1 - \epsilon[k]) * (1 - B_{static}[k])) \qquad \text{Eq. 19}$$

Substituting terms P[i] for $C_{offensive}[i]$ and D[k] for $C_{defensive}[k]$ in Equation 2 and substituting associated pass interaction parameters for tunable parameters $\alpha_C$, $\beta_C$, and $C_{offset}$ produces the overall pass interaction value $P_{overall}[i]$. For the pass interaction, the reference points producing term $r_{ik}$ are the positions of the ball and defensive player k's defensive mitt. Defensive pressure will not prevent the pass to be thrown, but instead produces pass directional error which in turn makes it more difficult or impossible for the pass recipient to catch the ball. The pass error produced is expressed in Equation 20.

Pass Error Magnitude $$E_{pass} = (1 - P_{overall}[i]) * E_{max} \qquad \text{Eq. 20}$$

The catch interaction is handled for any time step in which an in-flight pass is within catching range of an offensive player. Offensive player i's catch capability C[i] is expressed in Equation 21, where $C_{static}[i]$ refers to player i's static catching capability parameter.

Catch Capability $$C[i] = C_{static}[i] - (1 - \epsilon[i]) * (1 - B_{static}[i]) \qquad \text{Eq. 21}$$

Defensive player k's catch pressure capability D[k] is expressed in Equation 22, where $Y_{static}[i]$ refers to player i's in-traffic catching ability.

Catch Pressure Capability $$D[k] = (1 - \phi_{static}[i]) * (\xi_{scale} - (1 - \epsilon[k]) * (1 - B_{static}[k])) \qquad \text{Eq. 22}$$

Substituting terms C[i] for $C_{offensive}[i]$ and D[K] for $C_{defensive}[k]$ in Equation 2 and substituting associated catch interaction parameters for tunable parameters $\alpha_C$, $\beta_C$, and $C_{offset}$ produces an intermediate catch interaction value $C_{intermediate}[i]$. For the catch interaction, the reference points producing term $r_{ik}$ are the positions of the ball and defensive player k's defensive mitt. Additional factors affecting catch success must be accounted for to produce $C_{overall}[i]$ as shown in Equation 23 where:

$E_{pass}$ is the distance of the ball from an ideal catch point;
$C_{accEffect}$ is the tunable parameter determining effect of accuracy on catch probabilities;
$V_{ball}$ and $V_{max}$ are the current and maximum ball velocities; and
$C_{velEffect}$ is the tunable parameter determining effect of velocity on catch probabilities.

Overall Catch Value $$C_{overall}[i] = C_{intermediate}[i] - E_{pass} * C_{accEffect} - \frac{V_{ball}}{V_{max}} \times C_{velEffect} \qquad \text{Eq. 23}$$

If the resultant inequality expressed in Equation 24 is not satisfied, player i's catch attempt will be unsuccessful.

Catch Outcome Inequality $$C_{overall}[i] - x_{rand} > 0 \qquad \text{Eq. 24}$$

Threat Assessor

The composite threat assessment for a given offensive player comprises four independent assessments:
Physical Movement Threat Score—a measure of the static physical capabilities of a given player;
Skills Threat Score—a measure of the dynamic skills capabilities of a given player;
Dive Threat Score—a measure of the ability of a player to get to the rim based on current configuration of participating players; and
Ball Distance Threat Score—a measure of the player's threat due to proximity to the ball; the closer the player is to the ball the higher the player's ball distance threat score.

These component threat scores are combined to produce an overall offensive player threat score used to determine the actions of both defensive and offensive players. Offensive players attempt to maximize their own assessment; while defensive players attempt to minimize the assessment of their opponents.

The physical capability P[i] of player i is computed as a weighted aggregate of the player's various physical characteristics (reflected in game constants), as shown in Equation 25 where:

$W_{height}$, $W_{jump}$, $W_{mass}$, $W_{strength}$, and $W_{accel}$ are the relative weighting factors for each physical movement score component;
$H_{static}[i]$, $J_{static}[i]$, $M_{static}[i]$, $S_{static}[i]$, and $A_{static}[i]$ are the player's static values for height, jump, mass, strength, and lateral acceleration, respectively;
$H_{max}$, $J_{max}$, $M_{max}$, $S_{max}$, and $A_{max}$ are the maximum values for height, jump, mass, strength, and lateral acceleration, respectively; and
R[i] and $R_{max}$ are the player's distance and maximum distance from the basket, respectively.

Physical Movement Capability Value $$P[i] = W_{height} * \left(\frac{H_{static}[i]}{H_{max}}\right) + W_{jump} * \left(\frac{J_{static}[i]}{J_{max}}\right) + W_{mass} * \left(\frac{M_{static}[i]}{W_{max}}\right)\left(1 - \frac{R[i]}{R_{max}}\right) + W_{strength} * \left(\frac{S_{static}[i]}{S_{max}}\right)\left(1 - \frac{R[i]}{R_{max}}\right) + W_{accel} * \left(\frac{A_{static}[i]}{A_{max}}\right)\left(\frac{R[i]}{R_{max}}\right) \qquad \text{Eq. 25}$$

The closer the player is to the basket, the higher the player's mass and strength values, and the lower the player's acceleration value. In real-world basketball quicker players have the advantage on the perimeter as there is more room for movement. In contrast, bigger, stronger players have an advantage near the basket where there is less area to move and contact and collisions are a way of life. The dynamic component to a player's physical motion score based on range from the basket emphasizes or de-emphasizes the importance of these characteristics to match real-world physical advantages. The offensive player i's final physical movement score $P_{overall}[i]$ is computed by substituting P[i] for $C_{offensive}[i]$ and P[k] of the defensive players for $C_{defensive}[k]$ into Equation 2.

Player i's skill capability $\Omega[i]$ is computed as a weighted aggregate of the player's various skill characteristics. The skill capability for the offensive ball possessor is shown in Equation 26 where:

$W_{pass}$, $W_{catch}$, $W_{shoot}$ and $W_{dribble}$ are the relative weighting factors for pass, catch, shoot and dribble score components, respectively;
$P_{overall}[i]$, $C_{overall}[i]$, $S_{overall}[i]$ and $D_{overall}[i]$ are the player's pass, catch, shoot and dribble values, respectively; and
R[i] and $R_{max}$ are the player's distance and maximum distance from the basket, respectively.

Skill Capability Value (Ball Possessor Offense)     Eq. 26

$$\Omega[i] = W_{pass} * P_{overall}[i] + W_{catch} * C_{overall}[i] +$$
$$W_{shoot} * S_{overall}[i] + W_{dribble}[i] * D_{overall}[i] * \left(\frac{R[i]}{R_{max}}\right)$$

The off-ball offensive player i's skill capability $\Omega[i]$ is shown in Equation 27 where:

$W_{pass}$, $W_{catch}$, $W_{shoot}$ and $W_{dribble}$ are the relative weighting factors for pass, catch, shoot and dribble score components, respectively;

$P_{overall}[i]$, $C_{overall}[i]$, $S_{overall}[i]$ and $D_{overall}[i]$ are the player's pass, catch, shoot and dribble values, respectively;

$\theta(i,j) = P_{overall}[i] * (1 - \Phi_{deflect}[i,j]) * C_{overall}[j]$, where player i is the ball possessor and $\Phi_{deflect}[i,j]$ is the predicted probability that the pass from player i to player j is deflected; and $R[i]$ and $R_{max}$ are the player's distance and maximum distance from the basket, respectively.

Skill Capability Value (Off-Ball Offense)     Eq. 27

$$\Omega[i] = \vartheta(j, i) * \left(W_{catch} + W_{pass} * P_{overall}[i] + W_{shoot} * S_{overall}[i] + W_{dribble} * D_{overall}[i] * \left(\frac{R[i]}{R_{max}}\right)\right)$$

The further player i is from the basket, the less significant the player's dribbling value $D_{overall}[i]$. Equation 27 includes an additional term $\theta[i]$ as player i's ability to pass, shoot, or dribble is dependent on a successful pass from ball possessor k and catch from off-ball player i.

The predicted deflect value $\Phi_{deflect}(j,i)$ is computed by the Threat Scorer and not the Interaction Handler. This is necessary because the Interaction Handler computes a probability of deflection once the ball contacts a defensive mitt surface and does not predict an aggregate probability of ball deflection through the flight path of the ball. The computation for $\Phi_{deflect}[i,j]$ is shown in Equation 28 where:

D[k] is defensive player k's ball deflection capability as shown in Equation 5 (the value $\xi_{percent}$ is not determined as no deflection has yet taken place and is estimated by $$\frac{\xi_{scale}}{2}$$

Figure 9:
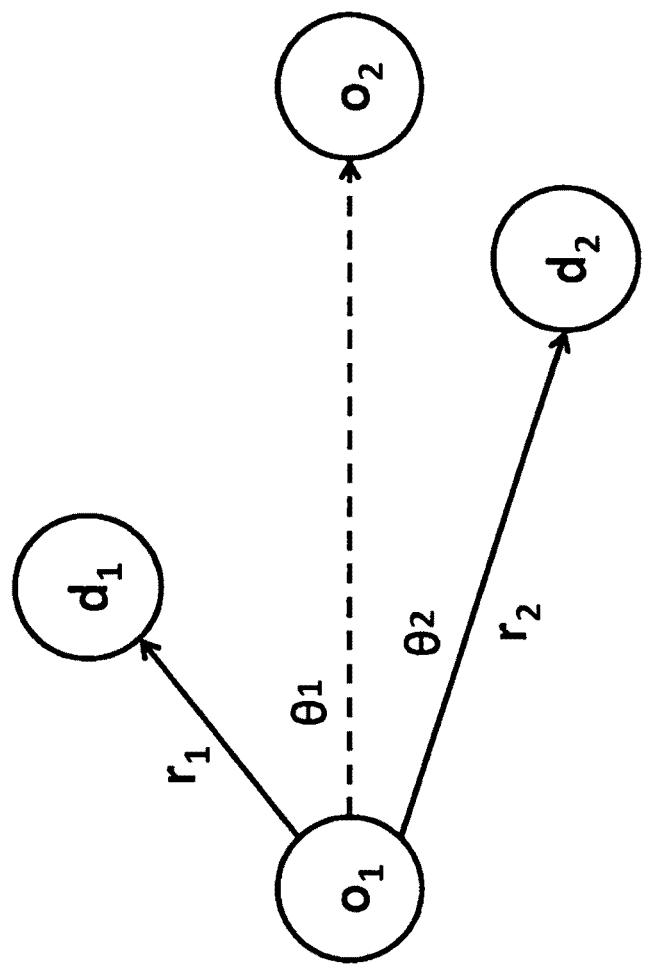
FIG. 9 is a diagram of an exemplary court configuration according to an embodiment of the present invention.

);

$D_{offset}$ is the tunable pass deflection probability offset parameter;

N is the number of defensive players in position to affect passing lane;

$\theta_k[i,j]$ is defensive player k's angle off the vector from passing player i to catching player j of player k as shown in FIG. 9;

$\theta_{max}$ is the maximum considered value for $\theta_k[i,j]$;

R[i,k] is the vector from passing player i to defensive player k as shown in FIG. 9; and R[i,j] is the vector from passing player i to catching player j as shown in FIG. 9.

Predicted Deflect Value     Eq. 28

$$\Phi_{deflect}[i, j] = (D[k] + D_{offset}) * \sum_{k=0}^{N-1} \frac{\theta_k[i, j] * \|R[i, k]\|}{\theta_{max} * \|R[i, j]\|}$$

The parameters $P_{overall}[i]$, $C_{overall}[i]$ and $D_{overall}[i]$ for pass, catch and dribble are computed through the Interaction Handler as described previously with minimal adjustments. The shoot value $S_{overall}[i]$ is computed slightly differently than in the Interaction Handler, as the relative ball and defense mitt positions at time of ball release on shot must be predicted. A predicted elevation advantage $\delta_{static}[k,i]$ is computed from the static parameters of players k and i as shown in Equation 29 where:

$W_{height}$ and $W_{jump}$ are relative weighting factors for height and jumping values;

$H_{static}[i]$ and $H_{static}[k]$ are the height values for players i and j; and $J_{static}[i]$ and $J_{static}[k]$ are the jump values for players i and Predicted Elevation Advantage $$\delta_{static}[k,i] = W_{height} * (H_{static}[k] - H_{static}[i]) + W_{jump} * (J_{static}[k] - J_{static}[i])$$     Eq. 29

The predicted elevation advantage is used to compute the elevation effect $E_{elevation}[k]$ as shown in Equation 30, where $\Delta H_{max}$ is the maximum predicted elevation advantage allowed.

Predicted Elevation Effect     Eq. 30

$$E_{elevation}[k, i] = \frac{\delta_{static}[k, i] + \Delta H_{max}}{2 * \Delta H_{max}}$$

The parameter $E_{elevation}[k,i]$ is substituted for $E_{elevation}[k]$ in Equation 15, from which point the Interaction Handler is used to produce term $S_{overall}[i]$.

Figure 10:
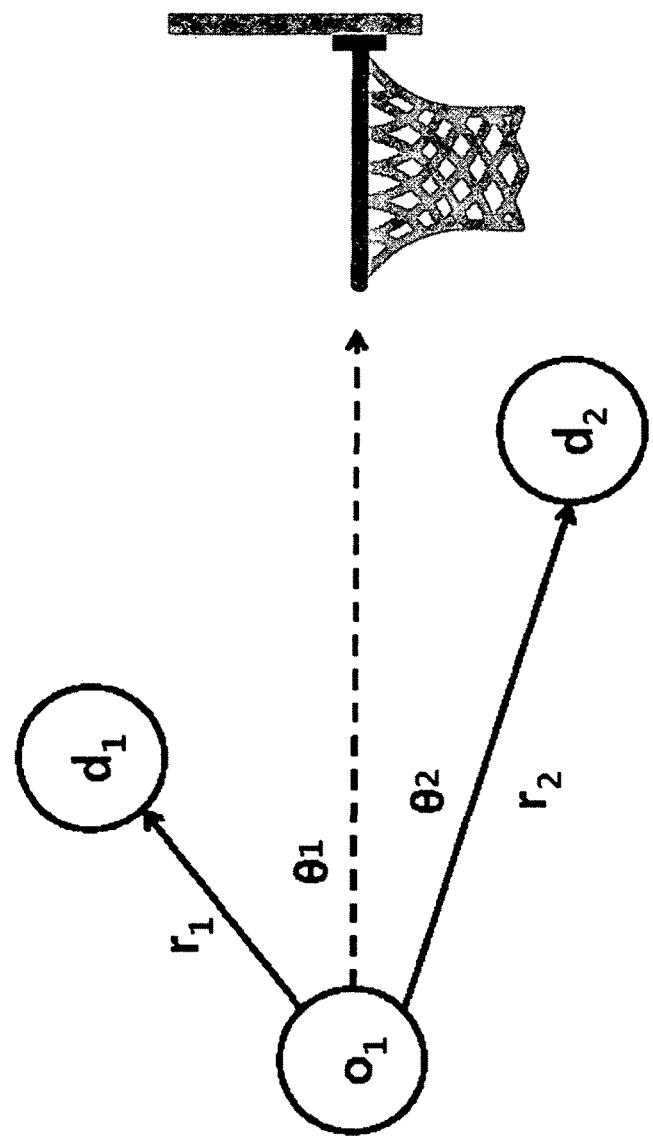
FIG. 10 is a diagram of an exemplary court configuration relative to a basketball goal according to an embodiment of the present invention.

A player's dive threat D[i] is a measurement of an offensive player's potential to reach the rim. This parameter is computed as shown in Equation 31 where:

$W_{velocity}$ is the relative importance weighting of velocity to dive threat in relation to open lane threat $\phi$;

$\overline{R[i]}$ is the range vector from offensive player i to the goal;

$\overline{V[i]}$ are offensive player i's velocity vector and maximum velocity magnitude, respectively;

$\phi$ is an aggregate measure of congestion of a driving lane;

N is the number of defensive players in position to affect driving lane;

$\theta_k$ and $\theta_{max}$ are the angle off vector to goal of player k and maximum value of $\theta_k$, respectively ($\theta_k$ is shown in FIG. 10);

R[i,k] and $R_{max}$ are the range from offensive player i to defensive player k and the maximum value of R[i,k], respectively (R[i,k] is shown in FIG. 10); and $A_{static}[k]$ and $A_{max}$ are the static acceleration parameter of defensive player k and the maximum acceleration value, respectively.

Dive Threat Score     Eq. 31

$$D[i] = W_{velocity} * \frac{\overline{R[i]} \cdot \overline{V[i]}}{V_{max}} + (1 - W_{velocity}) *$$

$$\frac{\phi}{\left(1-\sum_{k=0}^{N-1}\frac{\theta_k * \|R[i,k]\| * A_{static}[k]}{\theta_{max} * R_{max} * A_{max}}\right)}$$

The ball distance threat score B[i] for offensive player i is computed based on distance from ball possessor k. The closer a player is to the ball, the more likely the player will be to receive a pass from the ball possessor. Additionally, the closer the player is to the ball, the less time defenders have to react to the pass. The ball distance score B[i] is shown in Equation 32 where:

β is a tunable range scaling factor; and
$\overline{r}_{ik}$ is the vector from player i to player k.

Ball Distance Score  Eq. 32

$$B[i] = \frac{1}{1 + (\beta * \|\overline{r}_{ik}\|)^2}$$

The composite threat score $T_{composite}[i]$ for offensive player i, accounting for threat scores, is shown in Equation 33 where:

$W_{physicalMovement}$, $W_{skill}$, $W_{dive}$, $W_{ballDistance}$ are the weighting factors for physical movement, skill, dive, and ball distance threat scores, respectively;
P[i] is the physical movement score;
ω[i] is the skills capability score computed using Equation 26 or Equation 27, depending on whether offensive player i is the ball possessor;
D[i] is the dive threat score; and
B[i] is the ball distance threat score;

Composite Threat Score $T_{composite}[i]=W_{physicalMovement}*P[i]+W_{skill}*\Omega[i]*+W_{dive}*D[i]+W_{ballDistance}*B[i]$  Eq. 33

Player Artificial Intelligence

The Player Artificial Intelligence system dictates the movements and actions of computer controlled players. The most common play mode for basketball simulation games is for one game player to control one team composed of five players. Because the game player can only provide direct control of one out of five players at a single time, player artificial intelligence of the other four players is critical in creating the appropriate game flow and simulation accuracy. The Player Artificial Intelligence comprises Defensive Positioning, Offensive Positioning, and an Action Analyzer.

The term anchor point is used to refer to the default position of a defensive player. This position is defined differently depending on the type of defense being played by each defensive player. Therefore the anchor point system does not preclude an all-zone or all-man defense, and any hybrid defensive scheme (e.g., "box and 1", "triangle and 2", "1 man zone", etc.) can be defined within the framework of this system.

Figure 11:
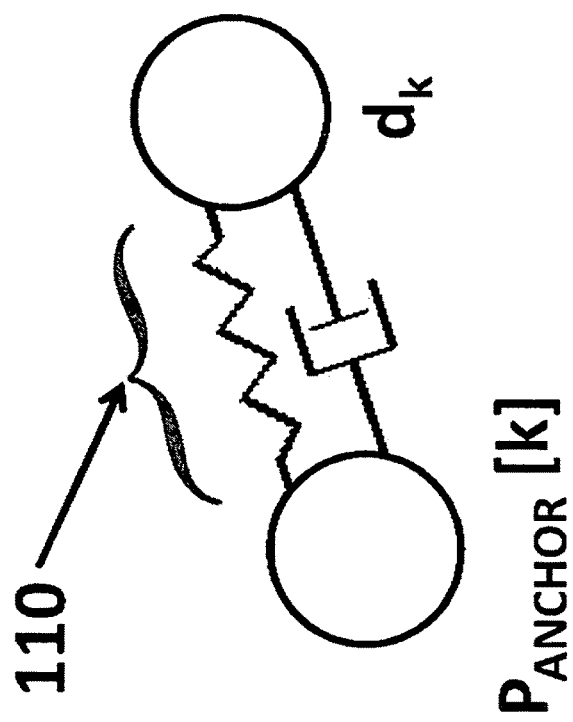
FIG. 11 is a diagram of a damped mass-spring model according to embodiments of the present invention.

In FIG. 11, the relationship between defensive player k and corresponding anchor point $P_{anchor}[k]$ (represented by node with anchor symbol) is shown for a zone defense. The anchor point $P_{anchor}[k]$ is placed at a fixed spot on the court depending on the basketball position (guard, forward, center)and zone defensive scheme (3-2, 2-3, 1-2-2, etc.). In the absence of external forces, defensive player k's position coincides with anchor point $P_{anchor}[k]$. If an external force acts upon defensive player k and causes a positional displacement, a spring damper 110 applies the necessary force to bring points back into co-location.

Figure 12:
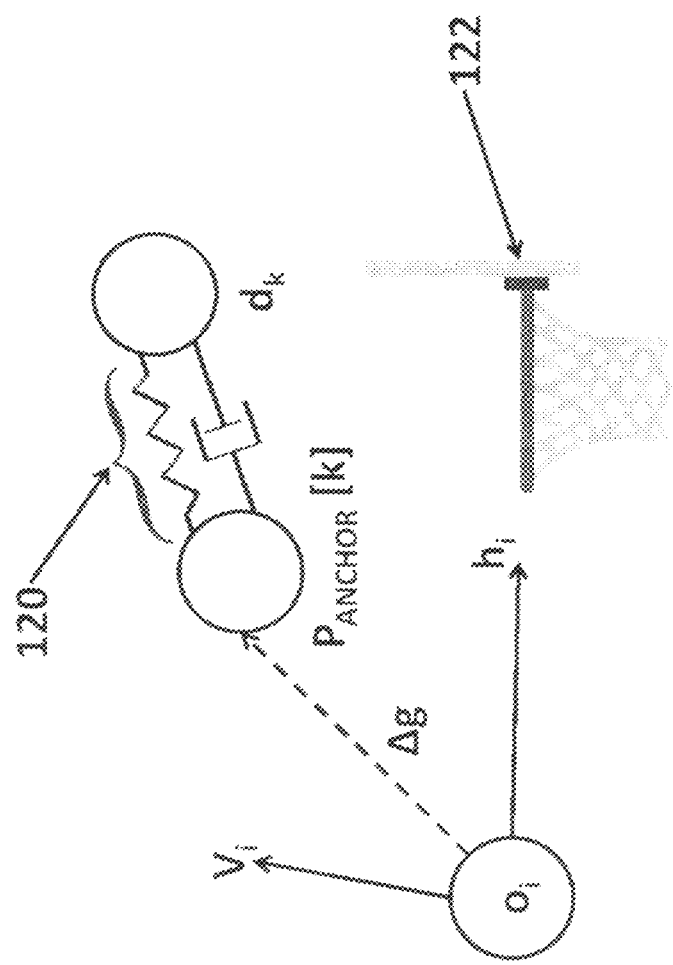
FIG. 12 is a diagram of a damped mass-spring model used to model game entities relative to a basketball goal according to embodiments of the present invention.

In FIG. 12, the relationship between and corresponding anchor point (represented by node with anchor symbol) is shown for man defense.

The relationship between the anchor point and the position of defensive player k remains a spring damper 120, but now the anchor point is not defined as a static, court-relative position. The anchor point $P_{anchor}[k]$ is defined as an offensive player relative position, linearly interpolated between the direction the hoop 122 and direction of offensive player velocity. The exact relationship is shown in Equation 34, where:

$P_{position}[i]$ is the position of offensive player i;
Δg is the tunable desired distance between offensive player i and defensive player k;
$h_i$ is the vector from offensive player i to the hoop;
$V_i$ is the velocity vector of offensive player i; and
$\beta=\|V_i\|/V_{max}$ and is the factor of interpolation between the two input vectors.

Anchor Point (Man Defense)  Eq. 34

$$P_{anchor}[k] = P_{position}[i] + \Delta g * \left((1-\beta)\frac{\overline{h}_i}{\|\overline{h}_i\|} + \beta * \frac{\overline{V}_i}{\|\overline{V}_i\|}\right)$$

Help defense in an embodiment of the simulation is modeled using Coulomb's Law. Coulomb's Law is a fundamental relationship in the field of electromagnetism expressing electrostatic force F between discrete charges. For the particular case of systems of discrete charges, the relationship is shown in Equation 35, where:

$\epsilon_0$ is the electric constant of vacuum permittivity;
q is the reference test charge;
$q_i$ is a charge i within the discrete charge system;
N is the number of discrete charges in system;
$\overline{r}$ is the position of the reference test charge; and
$\overline{r}_i$ is the position of a charge i relative to the reference test charge q.

Coulomb's Law (System of Discrete Charges)  Eq. 35

$$F = \frac{q}{4*\pi*\varepsilon_0} * \sum_{i=0}^{N-1} \frac{q_i * (\overline{r} - \overline{r}_i)}{\|\overline{r} - \overline{r}_i\|^3}$$

The concepts of discrete charges and the game of basketball are related by replacing point charges with player threat assessments, as described above. The resulting equation for adjusted defensive position $P_{adjusted}[k]$ of defensive player k is shown in Equation 36, where:

$P_{anchor}[k]$ is the default defensive position;
ΔP is the offset in position due to network of discrete threats;
α and β are tunable scale values for position offset parameter ΔP;
γ[k] is the help tendency parameter for defensive player k, which also scales the magnitude of position offset parameter ΔP;
$T_{composite}[j]$, applicable only if the defensive player k is in man defense, is a measure of the composite threat assessment of defensive player k's assigned man, denoted here as offensive player j (thus, the higher the threat assessment of offensive player j, the less help defensive player k is able to provide; if defensive player k is playing a zone defense, then $T_{composite}[j]=0$);

$T_{max}$ is the maximum composite threat assessment value possible for an offensive player;

$T_{composite}[i]$ is the composite threat assessment for offensive player;

N is the number of offensive players (if defensive player k is playing man defense, defensive player k's assigned man j is not included in this set);

$\bar{r}_{ki}$ is the distance from defensive player k's default defensive position $P_{anchor}[k]$ to offensive player i's anchor point; and $\Omega$ is a discriminating parameter.

Defensive Position Due to Attractive Forces  Eq. 36

$$P_{adjusted}[k] = P_{anchor}[k] + \overbrace{\frac{1}{4*\pi}\alpha*\gamma[k]*\left(1 - \frac{T_{composite}[j]}{T_{max}}\right)*\sum_{i=0}^{N-1}\frac{(T_{composite}[i])^{\Omega}}{1+(\beta*\|\bar{r}_{ki}\|)^2}*\bar{r}_{ki}}^{\Delta P}$$

Several modifications are made to Coulomb's original expression, most notably, the interpretation of attractive force as a positional displacement. The relationship between anchor point $P_{anchor}[k]$ and defensive player k's position is represented as a spring damper connection, as described above. Thus, an external force acting on defensive player k ultimately translates into a positional displacement. Directly interpreting the force as a positional offset avoids unnecessary complexity without loss of accuracy. Additionally, a 1 term is added to denominator inside summation to keep the term upper bounded.

Additional scaling factors $\alpha$ and $\beta$ are added to provide system level control of help behavior, while the help tendency parameter $\gamma[k]$ allows control at the player resolution. Also, the test charge from Coulomb's equation is always set to 1, as a defender's capability should be independent of his help tendency which is already quantified by the parameter $\gamma[k]$. Other differences include adding a discriminating factor $\Omega$ to help spread out and magnify differences in threat assessments, ignoring the attraction force to the assigned defensive player for man defense, and position offset trimming which is described in detail above.

An offensive player i's threat assessment represents player i's local advantage. Assuming that offensive players are stationary, as defensive players are drawn closer by the attractive force created by this advantage the cumulative defensive effect increases until an equilibrium state is reached. At this equilibrium state each defensive player feels an equal pull from each offensive player. Stated in terms of Equation 36, $P_{adjusted}[k]$ is computed continuously for each time step yielding different values until converging to a single value, at which point $P_{adjusted}[k]=P_{equilibrium}[k]$.

Figure 13:
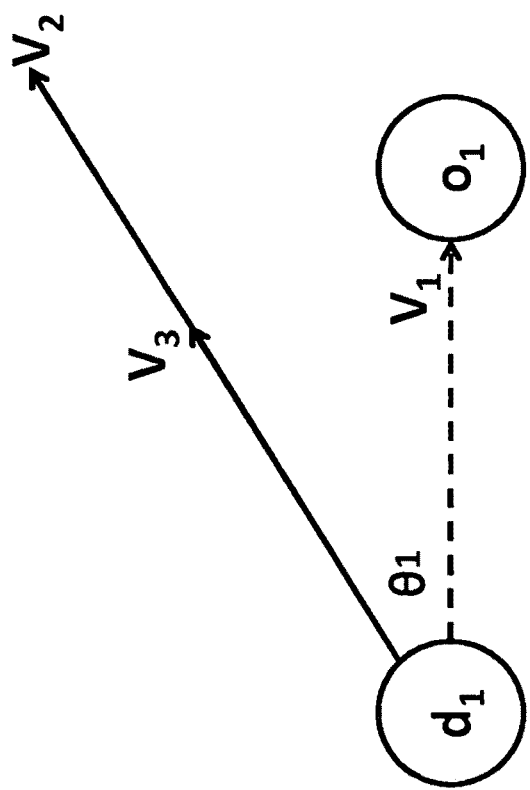
FIG. 13 is a diagram of an exemplary court configuration according to an embodiment of the present invention.

Position offset trimming ensures that the position offset $\Delta P$ computed from Equation 36 does not make the defensive player travel directly through an offensive player. In the context of the game of basketball, this would likely constitute a foul and, thus, an undesirable behavior. The process of position offset trimming is shown in FIG. 13, where:

$\bar{v}_2$ is the computed displacement $\Delta P$;

$\bar{v}_1$ is vector from defender to an offensive player;

$\theta_1$ is the angle between $\bar{v}_2$ and $\bar{v}_1$; and $\bar{v}_3$ is the resulting trimmed position offset.

Position offset $\Delta P$ is only magnitude limited to $\|\bar{v}_1\|$ if $\theta_1 < \theta_{threshold}$, where $\theta_{threshold}$ is a tunable parameter.

Using the threat assessments, a system is constructed to control the positioning of offensive players. From FIG. 8, it can be seen that an offensive player's static shoot capability produces a continuous surface of more or less decreasing capability with increasing range from goal. Taking into account the current capabilities and positions of defensive players produces the dynamic assessment for the shoot capability which can also be viewed as a continuous surface across position parameter $\delta$. In the context of other kinds of simulations, such a surface may have any number of dimensions.

A player's shoot capability is one input to composite threat assessment $T_{composite}[i]$ and each capability across position parameter $\delta$ produces a similar surface. The combination of all capability surfaces across position parameter $\delta$ in the manner shown in Equation 32 produces a continuous composite threat assessment surface $T_{composite}(i,\delta)$. One optimizing criteria for the position of an offensive player i is to maximize this threat assessment parameter $T_{composite}(i,\delta)$.

Besides optimization for maximum threat, an offensive player in the game of basketball attempts to "space the floor." While moving to position $\delta$ may result in higher $T_{composite}(i,\delta)$ value for offensive player i, having multiple players occupy the same space is an undesirable result. To spread out the court, a spacing score $S_{spacing}(i,\delta)$ is assessed for each position $\delta$. The computation of $S_{spacing}(i,\delta)$ is similar to the calculation of positional offset $\Delta P$ of a defensive player presented in Equation 34. Key modifications to Equation 34 are:

computing a repulsive instead of attractive force;

considering players on the same team and not the opposite team as the system of discrete threat assessments; and converting the resultant force to a percentage of maximum allowable force.

By using a modified version of Equation 34, the relative threat assessments of offensive players is considered as a spacing criterion. The result of this algorithm is that offensive players with greater current threat are given more space to operate, mirroring the behavior and considerations of real-world basketball players. Along with $T_{composite}(i,\delta)$ the parameter $S_{spacing}(i,\delta)$ is used as an optimizing criterion for the position of offensive player i.

Figure 14:
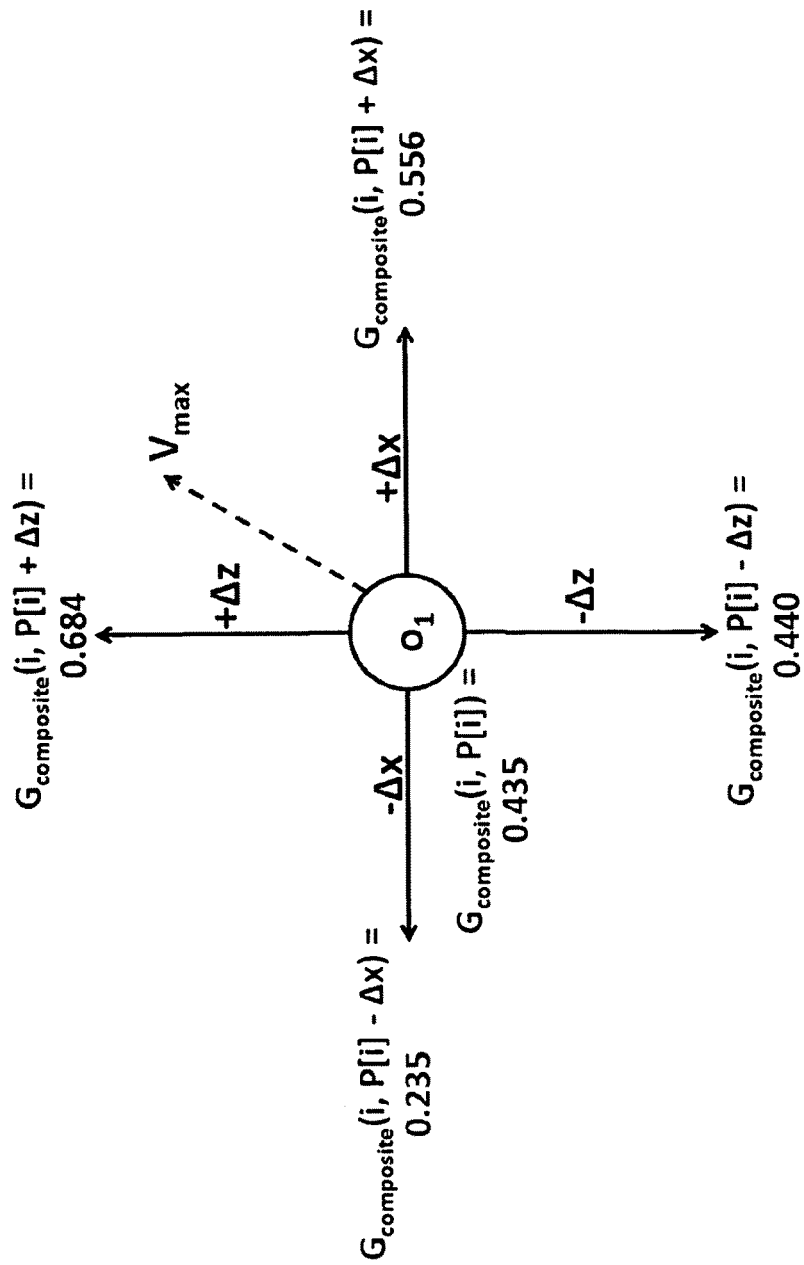
FIG. 14 is a diagram of a game entity including associated gradient search data.

Gradient search algorithms work by iteratively moving in the direction of highest optimality along a given surface and finding a local optimum. The computation of a gradient at a given time step is shown in FIG. 14, where:

+$\Delta x$, −$\Delta x$, +$\Delta z$ and −$\Delta z$ are equal magnitude offsets along orthogonal horizontal axes X and Z from offensive player $o_1$;

$G_{composite}(i,\delta)$ is the composite gradient search value for player i at position $\delta$ and is the term to be maximized by the gradient search ($G_{composite}(i,\delta)$ is computed for positions $\delta=P[0]$, $P[0]+\Delta x$, $P[0]-\Delta x$, $P[0]+\Delta z$ and $P[0]-\Delta z$, where $P[0]$ is the current position of player i; and $V_{max}$ is the direction of movement vector of a tunable magnitude (if none of the $G_{composite}(i,\delta)$ values for the delta positions exceed that of the current position, no movement takes place as the offensive player i is already at a local optimal point; otherwise, the direction of $V_{max}$ is linearly interpolated between maximum directions along each axis with $G_{composite}(i,\delta)$ as the interpolating factor).

The composite gradient search value $G_{composite}(i,\delta)$ for player i at position $\delta$ is computed as shown in Equation 37 where:

$T_{composite}[i,\delta]$ is the composite threat assessment;
$S_{spacing}(i,\delta)$ is the spacing score; and
$W_{spacing}$ is a tunable weighting factor determining relative importance of parameters $T_{composite}[i,\delta]$ and $S_{spacing}(i,\delta)$.

Composite Gradient Search Value $$G_{composite}(i,\delta) = (1-W_{spacing})*T_{composite}(i,\delta) + W_{spacing}*S_{spacing}(i,\delta) \quad \text{Eq. 37}$$

System-tuning parameters as well as player aggressiveness static parameters are used to control player movement tendencies. An offensive player i will only move if the gradient value $G_{composite}(i,\delta)$ satisfies the inequality shown in Equation 38 where:

$\alpha$ is the tunable scaling factor for offensive movement tendency; and
$A_{staticOff}[i]$ is the static parameter of offensive aggressiveness;

Offensive Movement Tendency $$G_{composite}(i,\delta) > \alpha * A_{staticOff}[i] \quad \text{Eq. 38}$$

Based on the static and dynamic parameters of the participating players, the Interaction Handler determines a probability of success for a given initiating action. This probability value, along with player static parameters, is used by the Action Analyzer to determine if a given action is initiated. Offensive and defensive aggressiveness parameters $A_{staticOff}[i]$ and $A_{staticDef}[k]$, respectively, provide probability of success threshold which must be satisfied for player i to initiate a given action. For instance, the strip outcome inequality from Equation 9 would become Equation 39:

Example Action Analyzer Threshold (Strip)

$$S[k] - D_{overall}[i] - x_{rand} > (1 - A_{staticDef}[k]) \quad \text{Eq. 39}$$

The previous detailed example represents one or more embodiments of the present invention. The game of basketball was chosen as a representative game of movement and position, with a specific set of rules and limitations. The proposed simulation model is in no way limited to the game of basketball. More complex dynamic games and simulations of motion and position with larger number of participants, more interactions, less restrictions, increased uncertainty, and different environmental factors can be constructed using the fundamental concepts discussed herein without departing from the intended scope of the invention.

Figure 15:
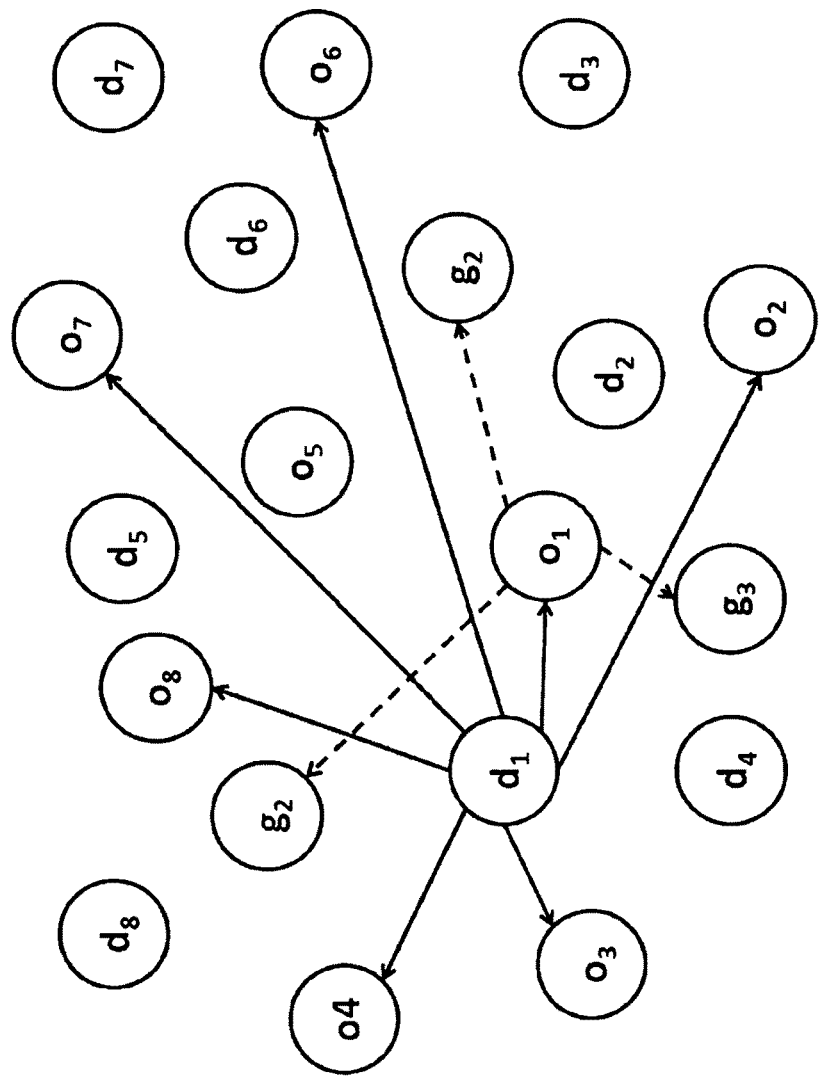
FIG. 15 is a diagram representing a scenario featuring sixteen game entities according to an embodiment of the present invention.

For example, the size and complexity of the dynamic game or simulation of motion and position can theoretically be increased to an arbitrarily large value number N of offensive, defensive, and goal entities. In practice, because computational load increases exponentially with number of entities a finite limit may exist. However, optimizations and localization of effect can significantly reduce computational load. An exemplary abstract game is shown in FIG. 15 where: p1 Nodes $o_{1...8}$ represent 8 offensive entities;
Nodes $d_{1...8}$ represent 8 defensive entities; and
Nodes $g_{1...3}$ represent 3 goal entities.

One of reasonable skill in the art would be able to apply the concepts outlined herein to many different simulation scenarios in many different applications. For example, the present invention may be applied to many different sports simulation video games as well as simulator programs and systems, such as flight simulators, for example. Thus, although the present invention has been described in detail with reference to certain embodiments thereof, other versions are possible. Therefore, the spirit and scope of the invention should not be limited to the versions described above.

I claim:

1. A method for simulating dynamic events in a video game operable on a processor, comprising:
   receiving game entity instructions related to at least one game entity and storing said game entity instructions in a storage module, said game entity instructions comprising instructions from artificial intelligence inputs and from human interface inputs;
   calling game constants associated with said at least one game entity from said storage module;
   continuously calculating a game entity balance measurement using a balance simulation model operated by said processor, wherein said balance simulation model comprises a movement model and a stability meter, wherein said instructions and said game constants are combined by said processor to generate a balance simulation model output, wherein forces are applied to said balance simulation model through a mass-spring damper system;
   generating game entity events based on balance simulation model output, wherein said game entity events relate to game entity actions and physics; and
   displaying said game entity events on a display.

2. The method of claim 1, wherein said movement model contains information defining game entity movement capability.

3. The method of claim 1, wherein said stability meter measures a sense of balance for said at least one game entity.

4. The method of claim 1, wherein said game entity instructions are provided by human interface device inputs.

5. The method of claim 1, wherein said artificial intelligence inputs are derived from a threat assessor.

6. The method of claim 5, wherein said threat assessor creates values of game entity threat projected onto an n-dimensional space and outputs artificial intelligence game entity instructions based on said values of said n-dimensional space.

7. The method of claim 6, wherein said artificial intelligence game entity instruction output is found by using a gradient search on said continuous n-dimensional space around said game entity for an optimal event instruction.

8. The method of claim 1, wherein generating game entity events comprises using an interaction handler.

9. The method of claim 1, wherein said game entity event is capable of being rendered for display through the use of a graphics engine.

10. The method of claim 1, wherein said game entity event is further defined as game entity dynamic movement and position.

11. A method for simulating game entity balance, calculated with the use of a processor, comprising:
    calling constants related to at least one game entity, wherein said constants are stored in a storage module;
    receiving instructions related to at least one game entity from at least a human interface input;
    applying said instructions and said constants to a movement model related to said at least one game entity;
    applying said instructions and said constants to a stability meter related to said at least one game entity;

combining outputs from said movement model and said stability meter generated by said processor to generate a game entity balance value, wherein game entity sense of balance is calculated by tracking the motion of said movement model with a delay and convergence time according to a damped spring-mass system model; and measuring a sense of balance for said at least one game entity with said stability meter, wherein said game entity balance value determines a game entity event, wherein said game entity event is displayable on a display.

12. The method of claim 11, wherein said movement model contains information defining game entity movement capability.

13. The method of claim 11, wherein said game entity instructions are user provided inputs.

14. The method of claim 11, wherein said game entity instructions are inputs provided by artificial intelligence.

15. The method of claim 11, wherein said game entity balance value determines game entity interaction outcomes.

16. The method of claim 15, further comprising rendering said game entity interaction outcomes for visual display using a graphics engine.

17. The method of claim 11, wherein said game entity balance value determines game entity event changes.

* * * * *